United States Patent Office 3,064,023
Patented Nov. 13, 1962

3,064,023
ORGANOMETALLIC COMPOUNDS
Geoffrey Wilkinson, London, and Raymond Burton, Widnes, England, assignors to Ethyl Corporation, New York, N.Y., a corporation of Delaware
No Drawing. Filed Sept. 11, 1959, Ser. No. 839,284
9 Claims. (Cl. 260—429)

This invention relates to novel organometallic compounds and their preparation. More particularly, the present invention relates to novel and useful transition metal complexes of azulene.

An object of this invention is to provide a novel class of organometallic compounds. Another object is to provide a class of stable transition metal coordination compounds of azulene. A further object is to provide a novel class of stable non-ionic azulene metal complexes having unsymmetric configurations. Other objects will become apparent from the specification and claims which follow.

The above objects are accomplished by providing non-ionic complex compounds of the metals of groups IVB–VIII in which a metal atom or atoms are bonded to azulene, which compound is stabilized by additional covalent bonding of the metal atom or atoms to dissimilar electron-donating groups. The metal in the novel compounds of this invention is a metal of groups IVB–VIII of the periodic table as shown in The Handbook of Chemistry and Physics (39th edition; The Chemical Rubber Publishing Company, Cleveland, Ohio, 1957) on pages 400 and 401. This includes those metallic elements having atomic numbers of from 22 through 28, 40 through 46 and 72 through 78.

The compounds of this invention may be represented by the formula $$(AM_xM'_yB_bC_c)_z$$

wherein A represents an azulene-containing molecule which may be substituted with various substituent groups, M and M' represent metal atoms which may be the same or different and are selected from groups IVB–VIII of the periodic table, B and C represent electron-donor groups which may be the same or different and are capable of donating from one to six electrons to the metal atoms M and M', $x$ is an integer ranging from one to three, $y$ is an integer ranging from zero to two, $z$ is an integer ranging from one to two, $b$ is an integer ranging from one to 12 inclusive and $c$ is an integer ranging from zero to six inclusive. The sum of the electrons donated to each of the metal atoms M and M' by the azulene molecule and the donating groups B and C is such as to give each of the metal atoms, M and M', an electron configuration ranging from two less up to and including the electron configuration for that of the next higher rare gas above M and M' respectively in the periodic table. A further way of defining the electron configuration of the metals M and M' is in terms of their respective atomic numbers. In our compounds, the atomic number of the metal M plus the number of electrons donated to it from azulene plus the number of electrons donated to it from B and C equals a number ranging from two less than up to and including the atomic number of the next higher rare gas above M in the periodic table. The same considerations apply to the metal atom M' so that it likewise has an electron configuration ranging from two less up to and including the electron configuration of the next higher rare gas above M' in the periodic table. When M and M' are the same, the compounds of our invention may contain up to five metal atoms in the molecule. An example of such a compound is bis(azulene) pentairon dodecacarbonyl.

Preferred organometallic compounds, within the formula defined above, are those in which $x$ is one or two, $y$ is zero or one, and the metals M and M' are selected from groups VB–VIII of the periodic table. Further preferred compounds of our invention are those in which the metals M and M' are selected from the group consisting of iron, manganese, molybdenum, rhenium, chromium, tungsten, vanadium, ruthenium, cobalt, nickel and rhodium. Those of our compounds which contain these metals are, in general, the most stable of the compounds of our invention.

The azulene molecule represented by A in the above formula may be azulene or a substituted form thereof. Azulene has the structural formula

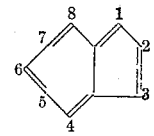

in which the positions are numbered as shown. The azulene compounds employed in our new organometallic compounds can be substituted with a wide variety of alkyl, aryl, alkenyl, cycloalkenyl, alkynyl, cycloalkynyl groups and the like. These groups, in general, contain from one to about 20 carbon atoms. Also, the azulene compounds employed in forming our new organometallic compounds can be substituted with groups other than hydrocarbon groups such as halogen groups, amine groups, nitro groups and the like.

Typical of the azulene compounds which can be employed in forming compounds of our invention are 7-isopropyl-1,4-dimethylazulene, acetyl azulene, benzoyl azulene, 1-benzylazulene, 1-bromoazulene, 4-butylazulene, 7-sec-butyl-1,4-dimethylazulene, 1,3-dibenzylazulene, 1,3-dibromoazulene, 3,7-diethyl-1,4-dimethylazulene, 1,2-dimethylazulene, 1,3-dimethylazulene, 1,8-dimethylazulene, 4,7-dimethylazulene, 4,8-dimethylazulene, 1,5-dimethylazulene, 4,8-diphenylazulene, 1-diphenylmethylazulene, 1-ethylazulene, 5-ethylazulene, 7-ethyl-1,4-dimethylazulene, 7-ethyl-1,2,4-trimethylazulene, 7-ethyl-1,4,6-trimethylazulene, 1-hexylazulene, 5-isopropenylazulene, 1-isopropylazulene, 5-isopropylazulene, 1-isopropyl-5,6-dimethylazulene, 1-isopropyl-7,8-dimethylazulene, 2-isopropyl-4,5-dimethylazulene, 4 - isopropyl - 2,8 - dimethylazulene, 6 - isopropyl-4,8-dimethylazulene, 7-isopropyl-1,4-dimethylazulene, 1-isopropyl - 5 - methylazulene, 1-isopropyl-6-methylazulene, 5-isopropyl-1-methylazulene, 5-isopropyl-2 - methylazulene, 1-, 4-, 5-, and 6 - methylazulenes, 4-methyl-8-phenylazulene, 5-(2-naphthyl)azulene, 1,3,5-tribromoazulene, 1,3,5,7-tetrabromoazulene and 1,4,8-, 2,4,5-, and 2,4,8-trimethylazulenes.

The constituents represented by B and C in the above formula are electron-donating groups capable of coordinating with the metal atoms M and M' in the novel compounds of this invention and donating thereto from one to six electrons. That is, the groups represented by B and C in the above formula are capable of sharing electrons with the metal atom so that the metal achieves a more stable structure by virtue of such added electrons. These electron-donating groups which coordinate with the metal atoms are generally either organic radicals or molecular species which contain labile electrons, which electrons assume more stable configuration in the molecule when associated with the metal atom or atoms. The electron-donating groups applicable to the formation of compounds of this invention may also be inorganic entities which are capable of existing as ions, such as hydrogen, the cyanide group and the various halogens.

Donors capable of sharing a single electron with a metal atom include monovalent organic radicals, the hydrogen atom, the cyanide group CN, and the halogens, fluorine, chlorine, bromine and iodine. These groups function as electron donors by sharing an electron with an electron of the metal atom in a single covalent bond.

When the electron donor group bonded to the metal atom or atoms in a compound of this invention is, or contains, a monovalent organic radical, this organic radical preferably contains up to 13 carbon atoms. These preferred organic radicals include alkyl, aryl, alkaryl, aralkyl, alkenyl radicals and the like. Specific examples include radicals derived from the following hydrocarbons: methane, ethane, propane, n-octane, 4-aryloctane, 2-phenyl heptane and the like.

Entities capable of sharing two electrons with a metal atom in the compounds of this invention include monoolefins, ammonia, primary-, secondary-, and tertiary amines, cyclic nitrogen compounds wherein the nitrogen is in the trivalent state, organo phosphine compounds, phosphine halides, arsines, stibines, bismuthines; mixed hydroorganic phosphines, stibines, arsines and bismuthines, isonitrile and the like. The nitrosyl group, NO, is an example of an entity capable of donating three electrons to a metal atom in the novel azulene metal coordination compounds of this invention.

In the compounds of this invention certain groups are capable of sharing four electrons in coordinate covalent bonds with the metal atom. These four electron donor groups include organic diamines, aliphatic diolefins, cyclic diolefins particularly those having conjugated double bonds, although non-conjugated diolefins are also applicable. When the donor group is a diamine best results are obtained when the methylene chain connecting the two nitrogen atoms is no longer than three carbons in length.

A preferred cyclic diolefin donor used in forming the compounds of our invention is cyclopentadiene. Compounds in which an azulene molecule, as defined above, and a cyclopentadiene molecule are both coordinated with a metal atom of groups IVB–VIII, are stable and have the characteristics of volatility and fuel solubility which make them more valuable as gasoline additives than certain of the other compounds of our invention. The cyclopentadiene molecule may contain from five to about 13 carbon atoms and may be substituted with various groups such as alkyl, aryl, cycloalkyl, halogens, nitro groups and the like.

The cyclopentadienyl radical contributes five electrons to certain of the compounds of this invention. The cyclopentadienyl radical found in these novel compounds contain from five to about 13 carbon atoms and thus includes the substituted cyclopentadienyl hydrocarbon radicals having up to eight carbon atoms in a side chain substituent which may be bonded to more than one ring carbon atom. Examples of such radicals include the octylcyclopentadienyl radical, the methylcyclopentadienyl radical, the indenyl radical and the like.

Examples of electron donating groups capable of donating six electrons to the metal atom are benzene and substituted benzenes. These groups may contain from six to 18 carbon atoms. Examples of typical donating groups are benzene, mesitylene, toluene, biphenyl, tetralin, m-hexyl-biphenyl and the like.

Typical compounds of our invention are azulene titanium nitrosyl compounds, azulene titanium cyclopentadiene compounds, azulene rhenium carbonyl compounds, azulene nickel halogen compounds, azulene vanadium benzene compounds and the like. Further typical compounds are azulene ruthenium butadiene compounds, azulene vanadium nitrosyl compounds, azulene cobalt cyanide compounds, azulene niobium phosphine halide compounds, azulene rhodium ammonia compounds and the like. Still other of our compounds may contain dissimilar metal atoms which may be bonded to one or more azulene containing molecules and also to each other through metal-to-metal bonds.

The novel compounds of this invention are prepared by reacting azulene with a transition metal compound so as to displace with azulene various groups attached to the transition metal. Thus, for example, azulene can be reacted with a diaromatic metal compound such as dibenzene chromium, a metal carbonyl such as dimanganese decacarbonyl, iron pentacarbonyl, molybdenum hexacarbonyl and the like, an aromatic metal compound such as benzene chromium tricarbonyl or toluene molybdenum tricarbonyl, or a dicyclopentadienyl metal compound such as dicyclopentadienyl manganese, dicyclopentadienyl nickel, dicyclopentadienyl titanium, dicyclopentadienyl cobalt and the like. In these various reactions, the azulene molecule displaces ligands from the organometallic reactant to form compounds of our invention.

The temperature and pressure employed in the above reactions is not critical so long as conditions are not so harsh as to decompose the reactants. Agitation may be employed in the reaction although its use is not critical. An inert atmosphere can be employed in the above reaction, if desired, to prevent decomposition of reactants or products due to contact with air. Typical of such blanketing gases are nitrogen, argon, helium and the like.

A suitable non-reactive organic solvent may, if desired, be used as a diluent in performing the above reaction. Ether solvents such as tetrahydrofuran, ethylene glycol dimethylether, ethyleneglycol diethylether, diethylene glycol dimethylether, diethylene glycol dibutylether, diethylene glycol diethylether can also be employed.

In many cases, the reaction is conveniently carried out by heating the reactants at the reflux temperature of the system under atmospheric pressure. To further illustrate the compounds of our invention and their mode of preparation, there are presented the following examples in which all parts and percentages are by weight unless otherwise indicated.

*Example I*

Four parts of azulene were heated at reflux for 15 hours with excess molybdenum hexacarbonyl dissolved in about 350 parts of petroleum ether (B.P. 100–120° C.). The reaction product was then heated under vacuum to remove the solvent and excess molybdenum carbonyl. The residues were dissolved in chloroform and on cooling, there crystallized 1.7 parts of azulene bis(molybdenum tricarbonyl). On analysis, there was found: C, 38.8; H, 1.99; O, 20.2 and Mo, 39.2 percent.

$C_{10}H_8O_6Mo_2$ requires: C, 39.3; H, 1.64; O, 19.7 and Mo, 39.3 percent. The product was obtained as fine black crystals which decomposed at 150° C. without melting. Although we are not bound by any theory as to the exact structure of the compound, it is believed that one $Mo(CO)_3$ group is bonded to the seven-membered ring of azulene and the other such group is bonded to the five-membered ring of azulene.

*Example II*

Using the same procedure as in Example I, 7-isopropyl-1,4-dimethylazulene was heated with excess molybdenum hexacarbonyl dissolved in petroleum ether to yield the compound, 7 - isopropyl - 1,4 - dimethylazulene bis(molybdenum tricarbonyl). On analysis, there was found: C, 45.3; H, 3.43; O, 17.3 and Mo, 34.4 percent. $C_{21}H_{18}O_6Mo_2$ requires: C, 45.1; H, 3.23; O, 17.2 and Mo, 34.4 percent.

*Example III*

Four and five-tenths parts of azulene and 14.6 parts of iron pentacarbonyl were heated in seven parts of petroleum ether for five days at 100° C. The reaction product was then heated in vacuum to remove the solvent and excess iron pentacarbonyl. The residue was extracted with petroleum ether (B.P. 40–60° C.) and crystallized therefrom by cooling to give 2.1 parts of azulene diiron pentacarbonyl. Found: C, 47.9; H, 2.85; O, 21.2 and Fe, 29.8 percent. $C_{15}H_8O_5Fe_2$ requires: C, 47.5; H, 2.10; O, 21.1 and Fe, 29.3 percent. The compound existed as dark-red crystals which decomposed on heating to 100° C. Although we are not bound by any theory concerning the exact structure of this compound, it is believed that a $Fe(CO)_3$ moiety is bonded to the five-membered ring in azulene and a $Fe(CO)_2$ moiety is bonded to the seven-membered ring in azulene. A further product obtained from the reaction mixture is a complex organometallic compound having the stoichiometry, diazulene pentairon dodecacarbonyl. This compound is found to have both terminal and bridging carbonyl groups in the molecule. This was observed through means of infrared analysis of the compound.

*Example IV*

Azulene and excess dimanganese decacarbonyl were heated for 36 hours in 21 parts of petroleum ether (B.P. 100–120° C.). The reaction mixture was heated under vacuum to remove solvent and unreacted dimanganese decacarbonyl. The residues were recrystallized from petroleum ether to give two products, azulene manganese tricarbonyl and azulene manganese tricarbonyl dimer. Both compounds have the same empirical formulas and on analysis gave: C, 58.6; H, 3.77 and O, 18.5 percent. Required for $C_{13}H_8O_3Mn$: C, 58.4; H, 3.0 and O, 18.0 percent. The product, azulene manganese tricarbonyl, was paramagnetic and had a melting point of 152–155° C. with decomposition. Azulene manganese tricarbonyl dimer was found to be diamagnetic.

*Example V*

Two moles of dicyclopentadienyl titanium dicarbonyl are mixed with one mole of 1-isopropyl-5-methylazulene and five moles of isooctane. The reaction mixture is heated at reflux under a nitrogen atmosphere for 24 hours. The reaction product is then discharged and heated under vacuum to remove the solvent and unreacted dicyclopentadienyl titanium dicarbonyl. The residues are dissolved in petroleum ether (B.P. 40–60° C.), and the solution is chromatographed. After separating the product, bis(1-isopropyl-5-methylazulene) titanium dicarbonyl, the petroleum ether solvent is removed through heating under vacuum to give a good yield of the compound.

*Example VI*

Two moles of nickel tetracarbonyl and one mole of 7-sec-butyl-1,4-dimethylazulene are dissolved in petroleum ether (B.P. 40–60° C.) and charged to an evacuated autoclave. The reaction mixture is heated at 100° C. for eight hours under a protective atmosphere of nitrogen. The autoclave is then cautiously vented, and nitrogen is bubbled through the reaction mass to remove unreacted nickel tetracarbonyl. After removal of the unreacted nickel tetracarbonyl, the reaction mixture is chromatographed to give a good yield of 7-sec-butyl-1,4-dimethylazulene nickel dicarbonyl which is removed from the petroleum ether by heating under vacuum.

*Example VII*

One mole of molybdenum hexacarbonyl, one mole of iron pentacarbonyl and one mole of 1-bromoazulene are dissolved in diethyleneglycol dimethylether. The reaction mixture is heated for 50 hours at 100° C. with stirring. The reaction mixture is then discharged, and the solvent and unreacted molybdenum hexacarbonyl and iron pentacarbonyl are removed by heating under vacuum. The residues are dissolved in low-boiling (40–60° C.) petroleum ether and chromatographed. There are obtained good yields of 1-bromoazulene bis(molybdenum tricarbonyl), 1-bromoazulene diiron pentacarbonyl and 1-bromoazulene(molybdenum tricarbonyl)(iron tricarbonyl).

*Example VIII*

Two moles of cyclopentadienyl vanadium tetracarbonyl and one mole of 4,8-diphenylazulene are dissolved in dioxane and heated at reflux under nitrogen for three days. The reaction mixture is then discharged and heated under vacuum to remove the solvent and unreacted cyclopentadienyl vanadium tetracarbonyl. The residues are dissolved in low-boiling (40–60° C.) petroleum ether and chromatographed to give a good yield of cyclopentadienyl vanadium 4,8-diphenylazulene dicarbonyl.

The compounds of our invention can be used in forming metallic mirrors comprising a layer or coating of a metal selected from groups IVB–VIII of the periodic table. These mirrors are formed by thermally decomposing one of the compounds of our invention at a temperature above 150–200° C. in the vapor phase. On the decomposition of the compound, the metal deposits on adjacent surfaces to form thereon a metallic mirror. These mirrors have useful and desirable properties of electrical conductance and further serve to protect the base material against corrosion. Also, they can be used to decorate the base material as by applying the mirror to a base material that is covered by a stencil. The compounds of the present invention can be deposited on glass, glass cloth, resins and other insulating supports. The resultant metal-coated material can then be used as a conductor or as an insulating tape for electrical applications. When the metals are deposited, through thermal decomposition on the support, a so-called "printed" electrical circuit can be obtained. It is preferred that an inert gas, e.g., argon, be used to protect the base material from oxidation during the mirror-forming operation.

The compounds of our invention have further utility as additives to fuels and lubricating oils. They are excellent antiknocks when used in fuels and are lubricity improvers when used in lubricating oils. For example, our compounds in which manganese or iron are present in the molecule are particularly preferred antiknocks. Our compounds in which molybdenum is present in the molecule are particularly preferred antiwear additives. Our compounds may be used alone or in combination with other additives such as scavengers, deposit-modifying agents containing phosphorus or boron and with antiknock agents such as tetraethyllead. They may be used in fuels containing from about 0.01 to about 13.8 grams of a lead antiknock per gallon.

When present in a liquid hydrocarbon fuel used in a spark ignition internal combustion engine, our compounds may be present in a concentration range from about 0.015 to about 10 grams per gallon based on the weight of metal. A preferred concentration range is from about 0.03 to about six grams of metal per gallon of fuel.

Our compounds can be added directly to the hydrocarbon fuels or lubricating oils after which the mixture is agitated until a homogeneous fluid results. Also, our compounds may be first blended into concentrated fluids containing solvents such as kerosene, antioxidants and other antiknock agents such as tetraethyllead. The concentrated fluid can then be blended with a hydrocarbon base material to form a fuel particularly adapted for use in a spark ignition internal combustion engine. When our compounds are employed in a concentrated fluid in combination with lead, they are present in an amount so that for each gram of lead present there is a sufficient quantity of our compound to give about 0.01 to about 10 grams of a group IVB–VIII metal. A preferred range comprises from about 0.1 to about six grams of a group IVB–VIII metal as a compound of the instant invention for each gram of lead as an organolead compound.

The scavengers employed in combination with our compounds are either phosphorus compounds or halohydrocarbons. The halohydrocarbon scavengers can be either aliphatic or aromatic with the halogen atoms being attached to carbon atoms either in the aliphatic or aromatic portion of the molecule. The scavenger compounds may also contain carbon, hydrogen and oxygen such as, for example, haloalkyl ethers, halohydrins, haloesters, halonitro compounds and the like. When used in forming an antiknock fluid, the atom ratio of metal to halogen ranges from about 50:1 to about 1:12. The halohydrocarbon scavengers normally contain from about two to about 20 carbon atoms in the molecule.

When a phosphorus scavenger is employed with our compounds in formulating an antiknock fluid, it can be present in an amount between about 0.01 to about 1.5 theories of phosphorus. A theory of scavenger is that amount of scavenger which will react completely with the metal present in the antiknock mixture. Reaction between a halide scavenger and lead gives the lead dihalide. A theory of halogen scavenger represents, in the case of lead, two atoms of halogen for each atom of lead. A phosphorus scavenger reacts with lead to form lead ortho-phosphate, $Pb_3(PO_4)_2$. Thus, a theory of phosphorus represents, in the case of lead, an atom ratio of two atoms of phosphorus to three atoms of lead. Theories of phosphorus or halohydrocarbon scavengers of other metals are computed in the same manner by stoichiometric calculations.

We claim:

1. Compounds having the formula $(AM_xM'_yB_bC_c)_z$, wherein M and M' are metal atoms selected from the class consisting of group IVB, group VB, group VIB, group VIIB and group VIII transition metal atoms, B and C are electron donating groups different from azulene which donate from one to 6 electrons to the metal atoms M and M', A is a monomeric organic azulene-containing molecule selected from the class consisting of the azulene molecule and substituted azulene molecules composed of atoms selected from the class consisting of carbon, hydrogen, oxygen, nitrogen and halogen, having from 10 to about 24 carbon atoms, wherein the azulene system is substituted with radicals selected from the class consisting of monovalent hydrocarbon radicals having one to about 14 carbon atoms, acetyl, amino, nitro and halide radicals, $x$ is an integer ranging from one to three, $y$ is an integer ranging from zero to two $b$ is an integer ranging from one to 12, $c$ is an integer ranging from zero to six, $z$ is an integer ranging from one to two, and both M and M' have an electron configuration varying from two less than up to and including that of the next higher rare gas above M and M' respectively in the periodic table.

2. Azulene bis(molybdenum tricarbonyl).
3. Azulene diiron pentacarbonyl.
4. Diazulene pentairon dodecacarbonyl.
5. Azulene manganese tricarbonyl.
6. Azulene manganese tricarbonyl dimer.
7. The compounds of claim 1 wherein $x$ is an integer ranging from one to two, $y$ is an integer ranging from zero to one and M and M' are metal atoms selected from the class consisting of group IVB, group VB, group VIB, group VIIB, and group VIII metal atoms.
8. The compounds of claim 7 wherein both M and M' have the electron configuration of the next higher rare gas above M and M' respectively in the periodic table.
9. The compounds of claim 8 wherein $y$ is equal to zero, $c$ is equal to zero, and $z$ is equal to one.

References Cited in the file of this patent

Burton et al.: "Chemistry and Industry," Nov. 29, 1958, p. 1592.

Knox et al.: "Proceedings of The Chemical Society," October 1958, p. 289.

Burton and Wilkinson: "Chemistry and Industry," Sept. 13, 1958, p. 1205.

"Chemical and Engineering News," vol. 32, No. 40, Oct. 4, 1954, pp. 3960–3961.